No. 797,367. PATENTED AUG. 15, 1905.
A. L. OLSON.
CONNECTION FOR INFLATING ROTATING TIRES.
APPLICATION FILED FEB. 20, 1905.

Witnesses
S. W. Atherton
L. C. Bull

Inventor
Axel L. Olson
By A. M. Wooster
Attorney

UNITED STATES PATENT OFFICE.

AXEL L. OLSON, OF ESSEX, CONNECTICUT.

CONNECTION FOR INFLATING ROTATING TIRES.

No. 797,367. Specification of Letters Patent. Patented Aug. 15, 1905.

Application filed February 20, 1905. Serial No. 246,480.

*To all whom it may concern:*

Be it known that I, AXEL L. OLSON, a citizen of the United States, residing at Essex, county of Middlesex, State of Connecticut, have invented a new and useful Connection for Inflating Rotating Tires, of which the following is a specification.

My invention has for its object to provide a connection for use upon motor-cars and other vehicles using inflated tires, which will permit air to be forced into the tire while the vehicle is in use and the wheel is rotating.

It is of course well understood that in using all kinds of vehicles having inflated tires punctures frequently occur which cause a tire to deflate more or less rapidly, and, furthermore, that the putting on of a new tire or the insertion of a new inner tube or even the pumping up a deflated tire are operations causing much inconvenience and loss of time. For this reason vehicles are not infrequently run a considerable distance with partially or wholly deflated tires, which is a source of grave danger to the vehicle and its occupants and usually ruins the tire. My present connection, which may be used with either an automatic or a foot or hand pump, enables the vehicle to be used and at the same time enables the operator to force air constantly into the tire, so that unless the puncture is a serious one the tire may be kept inflated and the vehicle used as usual until repairs can be made. The special style of pump used forms no portion of my present invention, although I preferably use my novel connection conjointly with a novel automatic tire-pump of my own invention, which forms the subject of an application for Letters Patent, Serial No. 246,479, filed of even date herewith.

Figure 1:
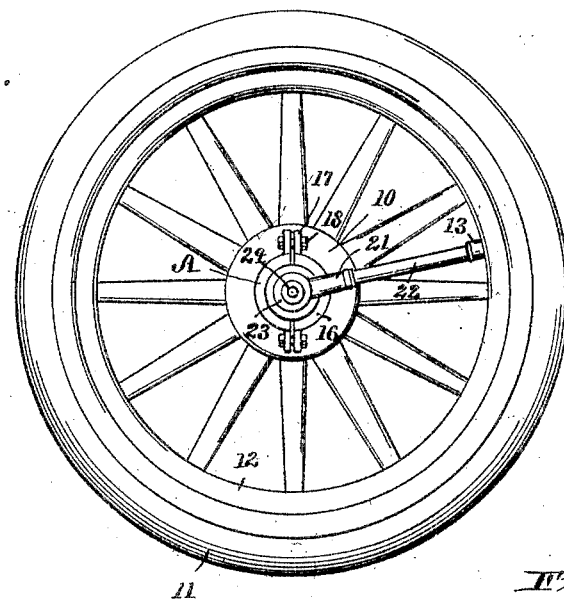
Figure 4:
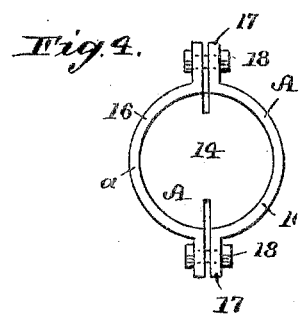
Figure 2:
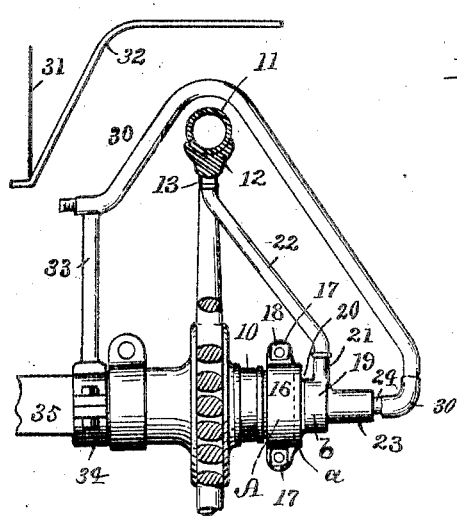
Figure 3:
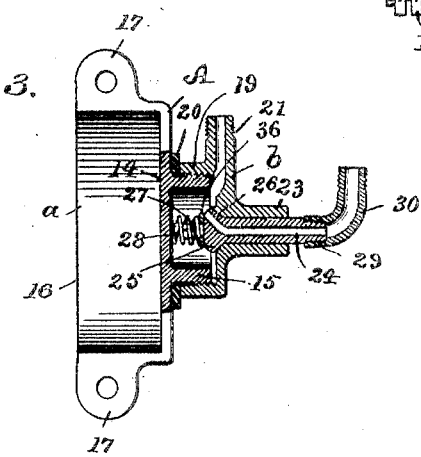

In the accompanying drawings, forming a part of this specification, Figure 1 is an elevation of a motor-car wheel illustrating the application thereto of my novel connection, which appears in end elevation; Fig. 2, a side elevation of my novel connection shown as applied to a motor-car wheel, which is partly in section; Fig. 3, a longitudinal section, on an enlarged scale, of the connection detached; and Fig. 4 is an elevation, on an intermediate scale, of the connection detached, as seen from the left in Fig. 3.

10 denotes the hub of a motor-car wheel, 11 the tire, and 12 the rim, having the usual nipple 13.

A denotes the body of my novel connection, which consists of two parts denoted, respectively, by $a$ and $b$. Part $a$ comprises a plate 14, having upon one side an externally-threaded hub 15 and upon the other side a two-part clamp 16, the members of which are so shaped as to receive the hub of a wheel closely and are provided with ears 17, through which bolts 18 pass, by means of which the connection is clamped tightly upon the hub, so as to rotate with it. Part $b$ of the body is provided with an internally-threaded hub 19, which engages hub 15 externally, a packing-washer 20 being shown between the end of hub 19 and plate 14 to insure an air-tight connection.

21 denotes a nipple leading from part $b$ for the attachment of a tube 22, the other end of which is attached to nipple 13 on the rim. This tube may be either flexible or rigid, as preferred.

23 denotes a sleeve extending outward centrally from part $b$, which receives a fixed air-tube 24, the tube serving as a bearing on which the sleeve rotates. The inner end of the air-tube is provided with a cone 25, which bears against a ground-seat 26 within the body at the inner end of sleeve 23. The base of the cone is provided with a plug 27, which supports a coil-spring 28, the ends of which bear, respectively, against plate 14 and against the base of the cone and which acts to hold the cone closely in engagement with the seat, thus making a perfectly-tight joint between the rotating body and the non-rotating air-tube and cone. This plug is preferably made angular, and a washer 36, held thereby against rotation, is interposed between the end of the spring and the base of the cone for the purpose of taking the wear of the spring. At the outer end of air-tube 24 is a nipple 29, from which an air-pipe 30, which may be either flexible or rigid, extends to the pump, which may be conveniently located to be operated by the driving mechanism of the car or by foot or hand power, as preferred.

31 indicates the car-body, 32 the mud-guard brace, and 33 a brace for supporting the air-pipe, which extends from a box 34 in which the axle rotates. It should be understood, however, that the special manner in which the air-pipe is supported is wholly unimportant so far as the principle of the invention is concerned.

The operation will be readily understood from the drawings. The entire connection, with the exception of the air-tube and cone, rotates with the wheel, the air-tube and cone being non-rotary. In use the cone is held closely in connection with the ground-seat by means of the spring, and thus escape of air from the connection is prevented. Air from the pump passes through tube 24 into the body and outward through nipple 21 and tube 22 to nipple 13 on the rim which leads into the tire, the special construction of the nipple and tire-valve (not shown) being wholly unimportant so far as the present invention is concerned, the object of which is simply to conduct air to the tire of a wheel while it is rotating.

Having thus described my invention, I claim—

1. An attachment adapted to be connected to a wheel and comprising a body having an air-chamber formed with an internal seat and having means for connection with a tire, and a non-rotating air-tube communicating with said chamber and having a cone which engages the seat.

2. A device of the character described comprising a body adapted for attachment to a wheel and having a seat and means for connection with a tire, a non-rotating air-tube upon which the body rotates and which is provided with a cone engaging the seat, and a spring bearing against the body and the cone to retain the latter closely in engagement with the seat.

3. A device of the character described comprising a body adapted for attachment to a wheel and having a ground-seat and a nipple for connection with a tire, a non-rotating air-tube having a nipple for connection with a pump, a cone for engaging the seat and a spring acting to retain the cone in engagement with the seat.

4. A device of the character described comprising a body having a clamp for attachment to a wheel-hub, a ground-seat in its outer face and a nipple for connection with a tire, a non-rotating air-tube having a nipple for connection with a pump and a cone for engaging the seat, and a spring for retaining the cone closely in engagement with the seat.

5. A device of the character described comprising a body adapted for attachment to a wheel and having a ground-seat and a nipple for the passage of air, a non-rotating air-tube upon which the body rotates, a cone engaging the seat, an air-pipe connected to the air-tube and a brace for supporting the air-pipe.

6. The combination with a wheel, of a body having a clamp for attachment to the wheel-hub, a ground-seat and a nipple, a tube adapted for connection with the nipple on the body and with a tire, a non-rotating air-tube having a cone for engaging the seat, means for supporting the tube and means for retaining the cone closely in engagement with the seat.

7. In a device of the character described the combination with a part $a$ comprising a plate having upon one side clamp members adapted to engage the hub of a wheel and upon the other side an externally-threaded hub, of a member $b$ having an internally-threaded hub adapted to engage the hub on part $a$, a nipple for the passage of air and a seat, an air-tube upon which part $b$ rotates and which is provided with a cone and a plug extending inward from the base of the cone and a spring supported by said plug and acting to retain the cone in engagement with the seat, substantially as described.

8. In a device of the character described the combination with a part $a$ comprising a plate having upon one side clamp members adapted to engage the hub of a wheel and upon the other side an externally-threaded hub, of a member $b$ having an internally-threaded hub adapted to engage the hub on part $a$, a nipple for the passage of air and a seat, an air-tube upon which part $b$ rotates and which is provided with a cone and an angular plug extending inward from the base of the cone, a washer held against rotation by said plug and a spring supported by the plug and bearing against the washer and against the plate of part $a$, substantially as and for the purpose set forth.

In testimony whereof I affix my signature in presence of two witnesses.

AXEL L. OLSON.

Witnesses:
 CHAS. B. TILEY,
 RICHARD B. TILEY.